(12) United States Patent  
Nobis et al.

(10) Patent No.: US 8,150,144 B2  
(45) Date of Patent: Apr. 3, 2012

(54) METHOD FOR DETERMINING THE ROTATIONAL AXIS AND THE CENTER OF ROTATION OF A VEHICLE WHEEL

(75) Inventors: Guenter Nobis, Nuertingen (DE); Steffen Abraham, Hildesheim (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 937 days.

(21) Appl. No.: 12/160,354

(22) PCT Filed: Jul. 2, 2007

(86) PCT No.: PCT/EP2007/056621  
§ 371 (c)(1),  
(2), (4) Date: Jul. 9, 2008

(87) PCT Pub. No.: WO2008/015063  
PCT Pub. Date: Feb. 7, 2008

(65) Prior Publication Data  
US 2011/0052041 A1    Mar. 3, 2011

(30) Foreign Application Priority Data

Jul. 31, 2006  (DE) .......................... 10 2006 035 924

(51) Int. Cl.  
*G06K 9/00*  (2006.01)  
(52) U.S. Cl. ..................................... 382/154  
(58) Field of Classification Search .................. 382/104, 382/107, 141, 151, 154, 296, 297, 305, 309; 356/139.09; 702/150–153  
See application file for complete search history.

(56) References Cited

U.S. PATENT DOCUMENTS

| 6,252,973 B1 | 6/2001 | January et al. |
| 6,397,164 B1 | 5/2002 | Nobis et al. |
| 6,710,866 B1 | 3/2004 | Adolph |

(Continued)

FOREIGN PATENT DOCUMENTS

DE    42 12 426    7/1993

(Continued)

*Primary Examiner* — Daniel Mariam  
(74) *Attorney, Agent, or Firm* — Michael J. Striker

(57) ABSTRACT

The invention relates to a method for determining the rotational axis and the rotating center of a vehicle wheel by means of at least two image capture units assigned to each other in position and situation during the journey of the vehicle, and by means of an analysis unit arranged downstream of said units, processing the recorded image information, taking into account multiple wheel features (10) present on the wheel or attached for the measurement, and by means of at least one bodywork feature present on the bodywork or attached for the measurement, wherein 2D-coordinates of the wheel features (10) and of the at least one bodywork feature are synchronously detected, and from these the 3D-coordinates of the features are calculated at certain time intervals and counted back to a previously established reference time point or corresponding reference position of the vehicle wheel, taking into account the distance traveled by the at least one bodywork feature relative to the reference position. To achieve measurement results that are as error free as possible, especially also when traveling on a real driving surface, it is provided that the paths of the wheel features (10) and of the at least one bodywork feature in the evaluation undergo an analysis with respect to the effects of at least one of the influencing variables, steering lock angle, steering motion, driving surface unevenness, and change of speed, and that from the analysis, correction factors or compensation functions are obtained for correcting the effects.

12 Claims, 4 Drawing Sheets

U.S. PATENT DOCUMENTS 7,444,752 B2 * 11/2008 Stieff et al. ............... 33/203.18

FOREIGN PATENT DOCUMENTS

| DE | 197 57 760 | 7/1999 |
| --- | --- | --- |
| DE | 199 34 864 | 2/2001 |
| DE | 100 50 653 | 5/2002 |
| DE | 10 2005 017 624 | 10/2006 |
| EP | 1 092 967 | 4/2001 |
| WO | 01/38843 | 5/2001 |

* cited by examiner

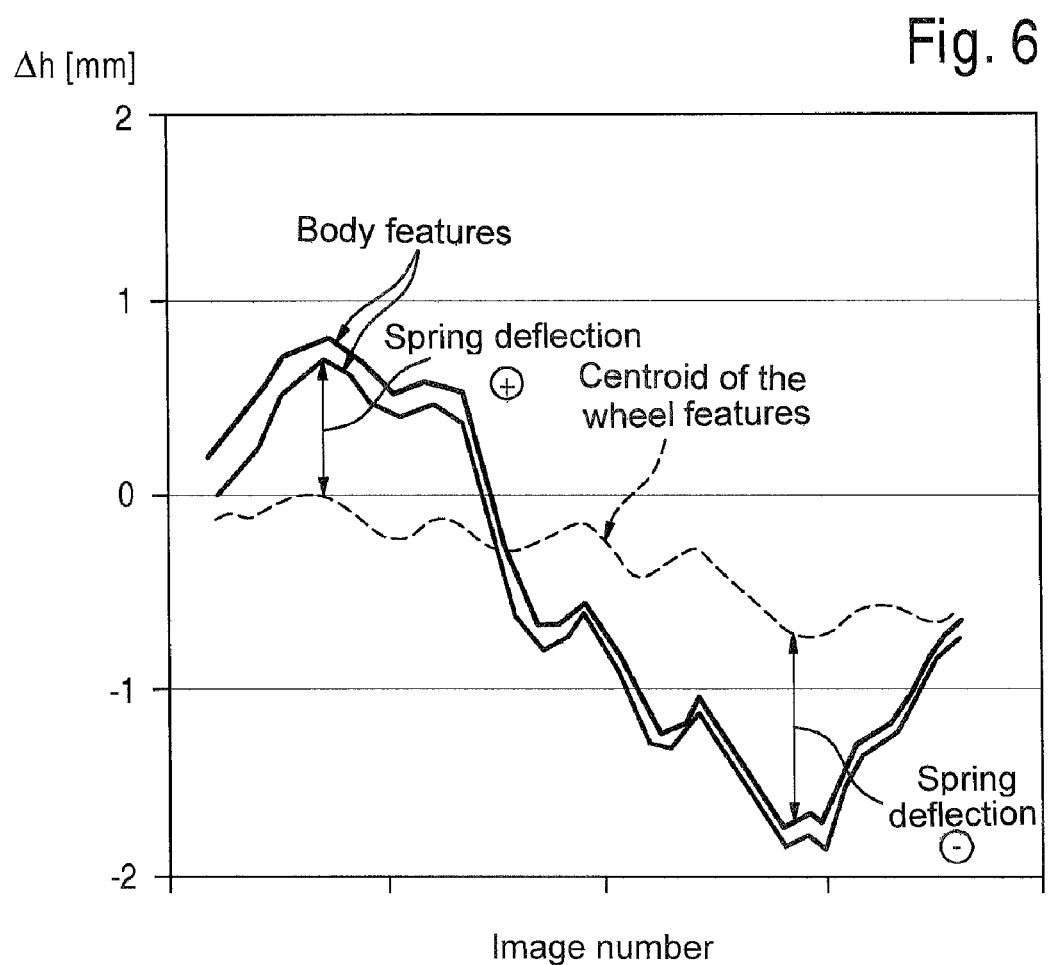

METHOD FOR DETERMINING THE ROTATIONAL AXIS AND THE CENTER OF ROTATION OF A VEHICLE WHEEL

CROSS-REFERENCE

The invention described and claimed hereinbelow is also described in PCT/EP2007/0656621, filed on Jul. 1, 2007 and DE 10 2006 035 924.0, filed on Jul. 31, 2006. This German Patent Application, whose subject matter is incorporated here by reference, provides the basis for a claim of priority of invention under 35 U.S.C. 119 (a)-(d).

BACKGROUND OF THE INVENTION

The present invention relates to a method for determining the geometric position of the rotational axis and the center of rotation of a vehicle wheel in a measurement station coordinate system, while the motor vehicle is being driven, by using at least two optical recording devices assigned to each other in terms of position, and by using a downstream evaluation unit that processes the image information that was captured, with consideration for several wheel features present on the wheel or attached for measurement purposes, and by using at least one body feature present on the body or attached for measurement purposes. In the method, 2D coordinates of the wheel features and the at least one body feature are detected in a time-synchronized manner, and, based thereon, the 3D coordinates of the features are calculated at certain time intervals, and they are back-calculated to a previously established reference time or a related reference position of the vehicle wheel, with consideration for the distance traveled by the at least one body feature relative to the reference position.

A method of this type is described in DE 100 50 653 A1. With this known method, the axis of motion, and data on the wheel geometry and axle geometry are ascertained with the aid of cameras, a reference coordinate system at the measurement station, and optical features on the vehicle wheel and the vehicle body. Similar methods for performing an optical measurement of wheel and axle geometry data are also presented in DE 199 34 864 A1 and DE 197 57 760 A1, in which cases the measurement is also carried out as the motor vehicle is driven past.

The aforementioned methods are based on the measurement of features that are present on the vehicle or that are attached specifically for measurement purposes. In addition to wheel features, at least one body feature and a reference feature system for referencing the measuring device are also provided. To determine the plane of wheel rotation, time-synchronized images are taken continually at different wheel positions (based on the angle of rotation) and different vehicle positions using the measuring devices. Based on the chronologically successive coordinates of the body features, the trajectory of the motor vehicle is determined relative to the reference features. The plane of wheel rotation is determined based on the positions of the coordinates of the wheel features captured in the various rotational positions of the wheel, with consideration for the vehicle motion. It is possible to ascertain the amount of a form/shape error of the wheel rim (rim runout), and to take it into account. Using this information, it is now possible to calculate the vehicle coordinate system and the data on the wheel and axle geometry. A description of the method for determining the plane of wheel rotation is not disclosed in detail.

Previously, roller sets or counterrotating slide plates were used to rotate the wheels while the vehicle was at a standstill in order to determine the rim runout as a correcting quantity for the axial measurement.

Methods are also known with which, in three different rolling positions of the wheel on the very flat surface of a wheel alignment station, the angular positions of angle sensors mounted on the wheel or of optical targets mounted on the wheel—the optical targets being composed of a precise configuration of individual, optically detectable surfaces—are detected by the wheel alignment station and, based thereon, a rim runout compensation is calculated. Targets of this type are described in detail, e.g., in U.S. Pat. No. 6,252,973.

The determination of rim runout while the wheel is lifted is no longer permitted by most vehicle manufacturers today, because the strain that occurs in the wheel suspension after the wheels are set down results in considerable errors in the subsequent measurement of wheel alignment.

With a method described in DE 42 12 426 C1, the wheels of the motor vehicle rotate in rolling prisms while the vehicle is at a standstill. A marking is placed on the wheels outside of the axis of rotation that may be registered optically and that is detected using two synchronized cameras while the wheel is rotating. The axis of rotation, toe and camber are determined based on the spacial positions of the markings on the wheel.

The object of the present invention is to provide a method for determining the axis of rotation and the center of rotation of a vehicle wheel, with which measured results that are as reliable and exact as possible are obtained during travel, in particular on a real road.

SUMMARY OF THE INVENTION

It is provided that the curved paths of the wheel features and of the at least one body feature are analyzed—in the evaluation—in terms of the effects of at least one of the influencing variables of steering angle, steering motion, uneven road conditions, or speed change, and that the analysis yields correction factors or compensating functions for correcting the effects.

With these measures, any effects of influencing variables on the measured results that arise from the actual conditions that may occur during actual driving on an actual, is uneven road are largely eliminated, thereby resulting in increased measuring accuracy and more reliable measurement results.

In closer examinations, the inventor determined that uneven features of actual roads and actual vehicle motions may significantly affect the accuracy of the measurement in the determination of the axis of rotation and center of rotation of vehicle wheels. What is involved in particular is accounting for the wobbling motion of the wheel, wheel rim, or a wheel adapter that occurs due to form/shape errors in the wheel rim, the tire, and, possibly, an additional wheel adapter when the wheel rotates (rim runout), the suspension motion of the wheel and the body that occurs due to uneven road conditions or speed changes during travel, and the steering motion of the wheels that occurs via the steering wheel when travel is not straight ahead, or via the motion of the steering wheel during travel.

The main advantages of the present invention are that it allows for a precise determination of the rotation axis and center of rotation of a wheel during travel on a real road. The use of additional mechanical devices is therefore avoided, e.g., roller sets or counterrotating slide plates for rotating the wheel while the vehicle is at a standstill, for use to determine the rim runout compensation as a correction factor for the alignment measurement.

The method may be used to determine rim runout compensation while a motor vehicle is being driven onto a wheel alignment station, when performing a quick wheel alignment measurement, e.g., as part of a vehicle inspection process on an inspection line—in which case the motor vehicle rolls on the workshop floor—or to perform a wheel alignment measurement during travel in different driving states.

Current requirements on the evenness of a wheel alignment station may therefore be reduced considerably, thereby making it possible to perform a measurement on a normal workshop floor or a good road surface.

In this case, no special markings need to be attached to the motor vehicle or the body. Instead, existing features may be used, or the determination may be carried out using a special method as described in DE 10 2005 017 624.

The method may also be used with alternative optical wheel alignment measuring systems, e.g., wheel alignment measuring systems with strip projection.

According to various embodiments for performing the evaluation and an exact determination of the rotation axis and center of rotation of the vehicle wheel, the curved paths are analyzed before the back-calculation of the 3D coordinates is performed, or while a joint compensating calculation is carried out as part of the back-calculation.

It is possible to eliminate faulty effects of influencing quantities when the correction factors or compensating functions that are ascertained are roll angle data determined via the difference in the trajectory of the body features of the left and right sides of the vehicle.

According to further advantageous measures with which further undesired effects of influencing quantities may be eliminated, the correction factors or compensating functions that are ascertained are spring motion data determined from the difference in the trajectory of the body features and the trajectory of the center of rotation of the vehicle wheel, both in the z direction, and steering angle data of the wheel that are ascertained from the trajectory and/or the relative speed derived therefrom, and/or the acceleration of the wheel features relative to the trajectory of the body features in the projection of the 3D trajectories in the plane of the road. To derive the correction factors or a compensating function, at least the left vehicle wheel or at least the right vehicle wheel, or both vehicle wheels are analyzed simultaneously.

When the wheel alignment station is designed as a lift platform, negative effects of forces due to mass and acceleration on the lift platform may be largely excluded from the measured results by ascertaining dynamic and/or quasi-static motion data on the lift platform with the vehicle on it from the analysis of the trajectory of at least one of the measurement features present on the lift platform or attached thereto.

The complexity of the compensating functions is limited by detecting higher dynamic processes over time of the trajectory of the wheel features and/or the body features, and by withholding them from the further data analysis.

According to further advantageous measures for eliminating the effects of undesired influencing quantities on the measured results, additional correction data or correction functions are used that account for the dependence of the toe and camber on the spring deflection state and the steering angle.

According to an advantageous procedure, the correction data are made available via a vehicle data base for the particular motor vehicle type that is present anyway in a wheel alignment system.

According to a further advantageous procedure, if specific vehicle data are lacking, the particular motor vehicle is automatically assigned to a predefined vehicle class, and the correction factors to be used are provided by the data base; it is provided that the motor vehicles are classified according to parameters relevant to the ground drive.

According to various further advantageous embodiments, it is provided that the regression analysis performed based on the compensating functions relates to the entire vehicle, to the front axle and rear axle, or to each individual wheel.

BRIEF DESCRIPTION OF THE DRAWINGS

The present invention is explained in greater detail below using exemplary embodiments, with reference to the drawings.

FIG. 6 shows the graph of a distance between body features and the centroid of the wheel features plotted against the image number, with inward spring deflection and outward spring deflection.

DETAILED DESCRIPTION OF THE PREFERRED EMBODIMENTS

Figure 1:
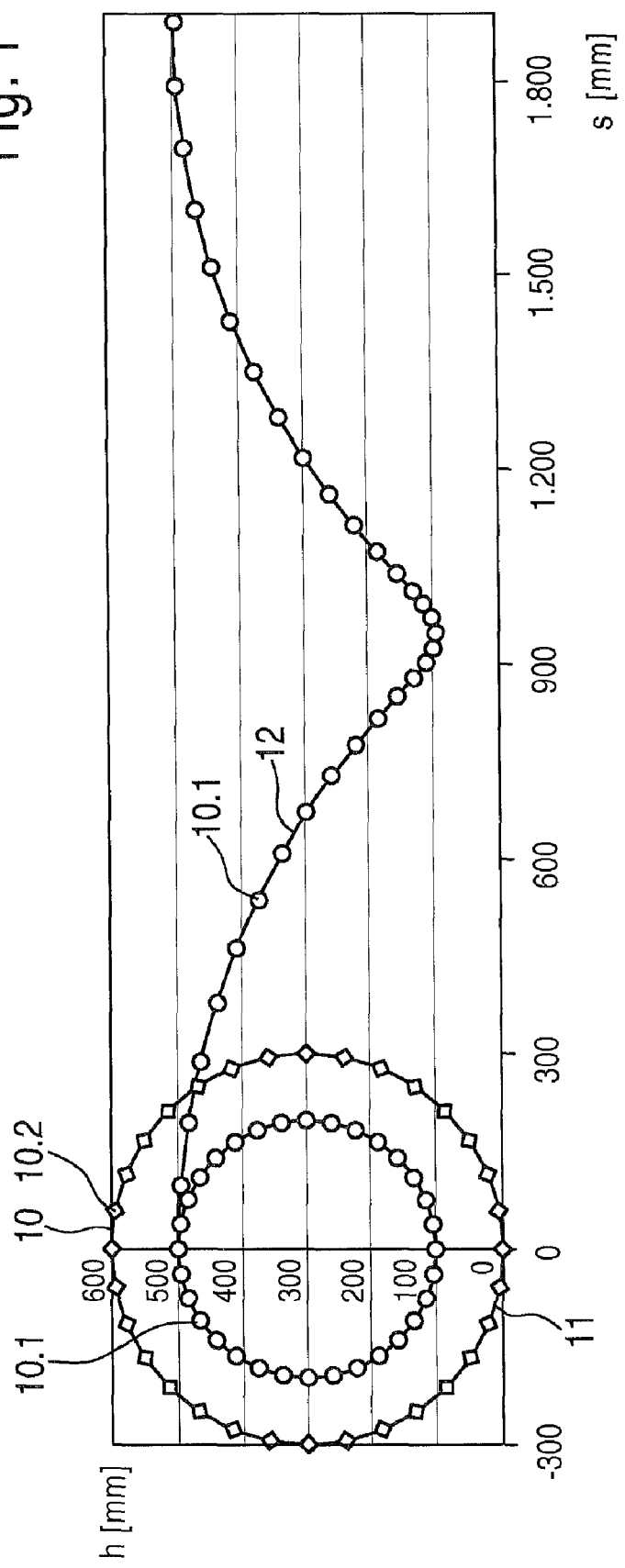
FIG. 1 shows the trajectory of a wheel feature for a rotating wheel and a rolling wheel.
Figure 2:
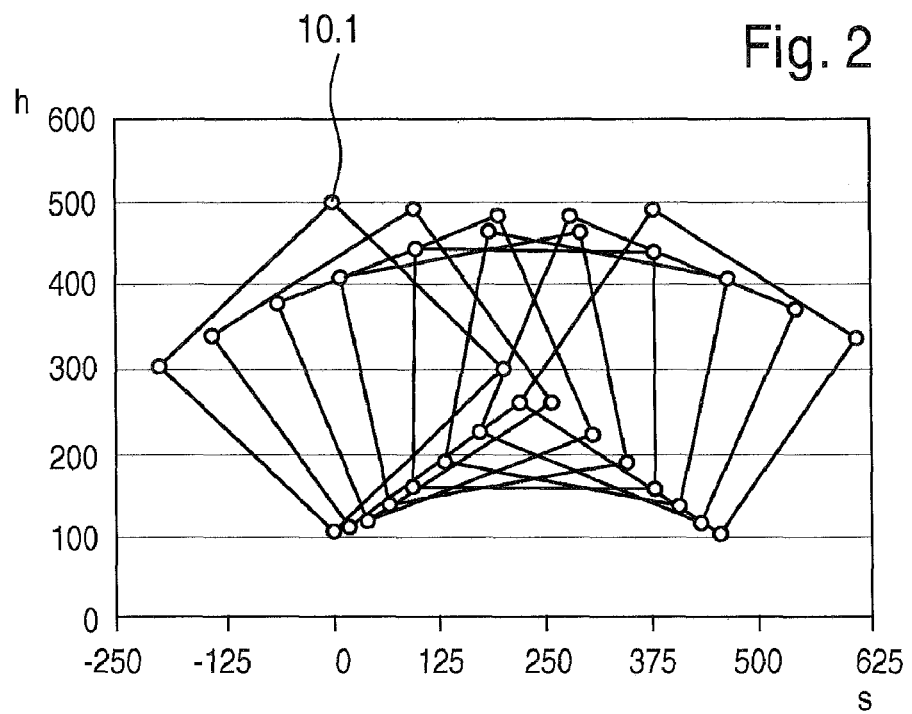
FIG. 2 shows the coordinates of four wheel features in eight rolling positions of the wheel.
Figure 3:
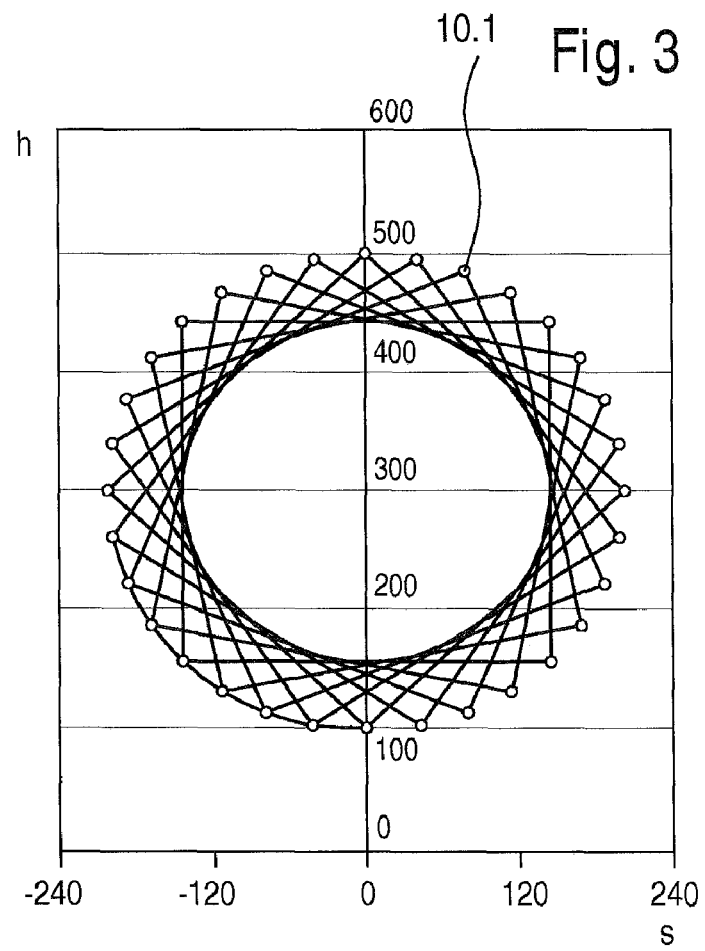
FIG. 3 shows coordinates of four wheel features in eight rolling positions of the wheel according to FIG. 2 after back-calculation to a reference position.

FIG. 1 shows, in the left half of the illustration, the trajectory of two wheel features 10, i.e., an inner wheel feature 10.1 close to a center of rotation, and an outer wheel feature 10.2 close to the outer circumference, both of which are located at a level h above rolling path s. When the wheel performs a rotating motion with the vehicle at a standstill (e.g., with the vehicle raised), trajectories 11 are circular trajectories. FIG. 1 also shows trajectory 12 of inner wheel feature 10.1 while the vehicle is moving and the wheel is therefore rotating. Trajectory 12 is a cycloid, assuming that the motor vehicle travels along a straight line on an ideal plane. To record trajectories 11 and 12, it is possible to use the measuring devices with the optical recording devices described in greater detail in the publications mentioned initially, in which case time-synchronized images are captured from different perspectives. FIG. 2 shows the coordinates of four wheel features 10.1 in eight rolling positions of the vehicle wheel along rolling path s. FIG. 3 shows the coordinates of the four wheel features in FIG. 2 in the eight rolling positions of the vehicle wheel after back-calculation to a reference position.

Figure 4:
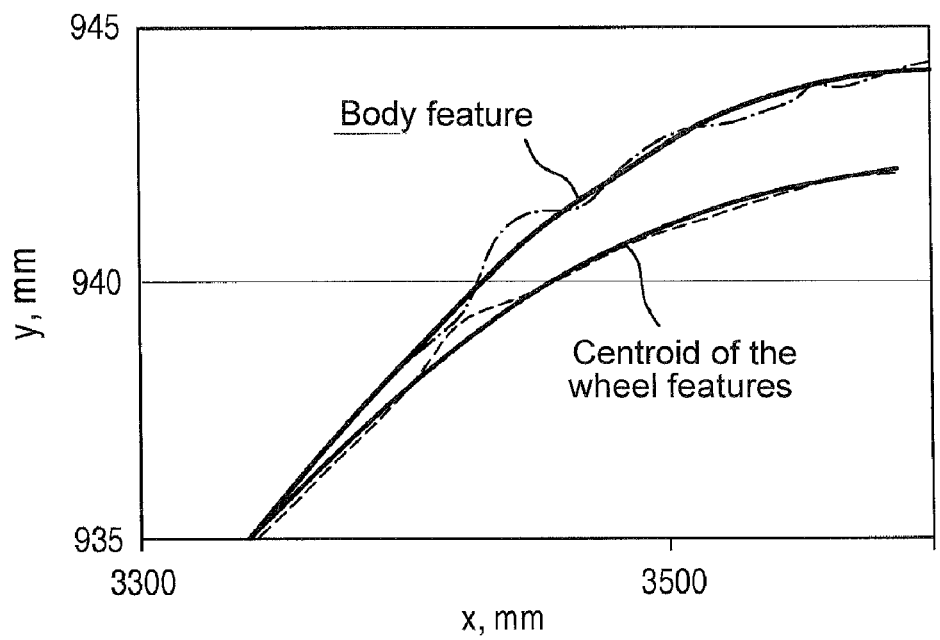
FIG. 4 shows the projection of curved paths of body features and the centroid of wheel features in the plane of the road x, y.
Figure 5:
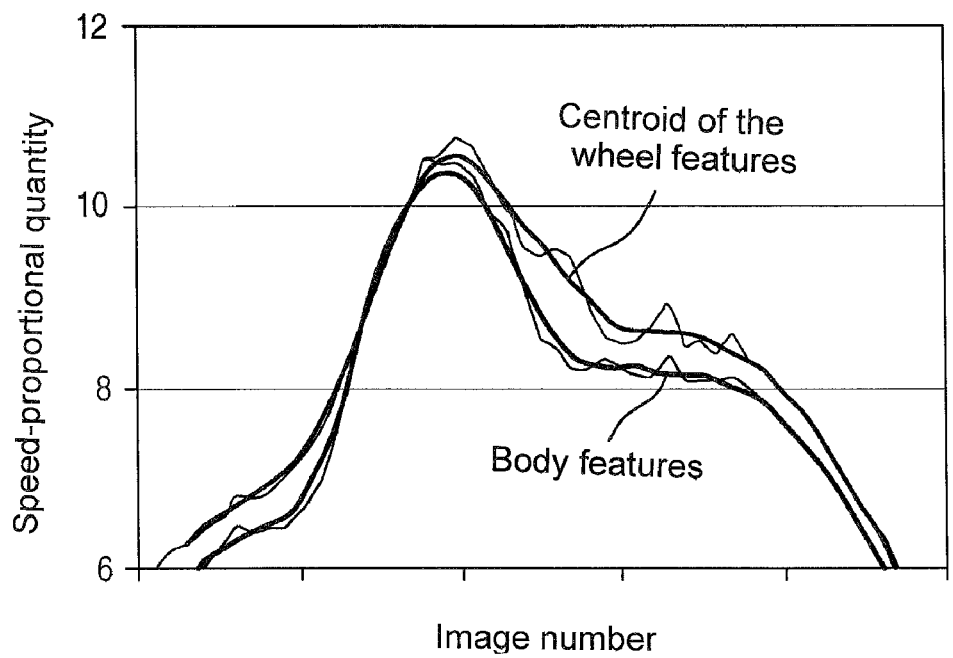
FIG. 5 shows a speed-proportional quantity of the wheel features and body feature, presented as a function of the image number.

FIG. 4 shows the projection of the curved paths of a body feature (dash-dotted line) with a compensating curve (solid line) and the centroid of wheel features (dashed line), also with a compensating curve (solid line) in road plane x, y. FIG. 5 shows the speed of a body feature and the centroid of the wheel features expressed as a speed-proportional quantity plotted against image number instead of time. A compensating curve is also shown in FIG. 5. The steering motion may be ascertained from the is different course of the speed.

FIG. 6 shows—relative to the front wheel axis—a distance Δh between body features and the centroid of the wheel features, plotted against image number. Positive spring travel "+" describes outward spring deflection, which occurs during acceleration, and negative spring travel "−" describes inward spring deflection, which occurs during deceleration, as indicated next to the double arrows.

When a wheel rolls in a straight line on an even road, the wheel features outside of the center of rotation move as shown on curved paths 12 in the form of cycloids, and the body features move on straight trajectories along the driving route. The particular cycloid is composed of the rotational motion of the wheel feature, the center of rotation, and the driving path or rolling path s that was covered, as shown in FIG. 1. To perform the method—as disclosed in the patents described above—, two-dimensional coordinates (2D coordinates) of the wheel and body features are detected in the measuring range of the wheel alignment system, and they are used to calculate corresponding three-dimensional (3D) coordinates. As the motor vehicle travels, 3D coordinates of the wheel and body features are measured in this manner at certain time intervals that correspond to the measuring frequency, along cycloids 12 of wheel features 10 and curved paths of the body features.

After the measured values are recorded, in a first step, all coordinates of the sequentially measured wheel features are back-calculated to a previously defined reference time or a corresponding reference position of the vehicle wheel with consideration for the path covered relative to the reference position of the body features. Wheel features 10 are therefore located on circular trajectories 11 around the 3D rotation axis of the vehicle wheel. A result is obtained that corresponds to the rotation of every wheel feature while the vehicle is at a standstill, as shown by the back calculation according to FIG. 3, which is based on the illustration in FIG. 2. Due to the form/shape error of the vehicle wheel and/or the spacial position of the wheel features on the vehicle wheel, wheel features 10 move on parallel planes of rotation relative to the plane of rotation of the vehicle wheel. The rotating vector of the vehicle wheel is now calculated based on the back-calculated 3D coordinates of wheel features 10 with consideration for the parallel nature of the planes of rotation of individual wheel features 10, and the center of rotation is determined with consideration for the distances between the parallel planes of rotation.

In practical application it has been shown that the required level of accuracy is not attained using this simple model of travel by an actual vehicle on an uneven (real) road.

The following working mechanisms are therefore also taken into consideration in the back-calculation of the measured 3D coordinates of the wheel and body features:

If the steering is not positioned for straight-ahead driving, the result is that the wheel and body features moving through space do not move on a straight line in the projection on the road plane, but rather on a curve.

When the steering wheel is moved, the wheel and body features—in particular in the projection of the spacial curve of the moving features on the road plane—do not move along a straight line, but on a curve with inflection points.

Uneven road conditions result in a change in the motion of the wheel and body features, in particular in the direction perpendicular to the direction of travel (the z direction). Different uneven features on the wheel contact points result in rolling and/or tilting motions of the motor vehicle, changes in the distribution of wheel load, and/or the spring deflection state of the individual wheel. More extreme changes in the road profile result in dynamic inertial forces, which affect—in particular—a spring motion of the body (spring elements in the wheel suspension) and the tire.

Speed changes result in forces of acceleration and deceleration, which affect—in particular—a spring motion of the body (spring elements in the wheel suspension) and the tire.

When the wheel alignment station is designed as a lift platform, the aforementioned dynamic inertial and acceleration forces may even cause the lift platform to move.

In a first embodiment, it is therefore provided that, before the aforementioned back-calculation of the 3D coordinates of the wheel features, the curved paths of the wheel and body features are analyzed in order to determine the effects of the stated working mechanisms on the current measurement. The analysis yields correction factors or compensating functions, with which the effects, e.g., of uneven road conditions, steering motions, or speed changes in the measured 3D coordinates are corrected before the back-calculation is performed. The following correction factors or compensating functions are ascertained, for example, and they are then used to correct the measured value:

Rolling angle, based on the difference in the trajectory of the body features of the left and right sides of the vehicle, Spring motion, based on the difference in the trajectory in the z direction of the body features and the trajectory of the centroid of the wheel features, which approximately corresponds to the center of rotation of the wheel.

The steering angle of the wheel, based on the trajectory and/or the relative speed derived therefrom, and/or the acceleration of the centroid of the wheel features relative to the trajectory of the body features in the projection of the 3D trajectories in the road plane. To derive correction factors or a compensating function, the left and right vehicle wheels are analyzed simultaneously, dynamic motions of the lift platform with the vehicle on it based on the analysis of the trajectory of a feature present on the lift platform or attached thereto.

To limit the complexity of the compensating functions, it is provided that higher dynamic components are detected over time or in the course of a parameter, e.g., steering angle or spring deflection, as a function of another parameter, e.g., the route, and, if they are beyond a permissible extent, to exclude them from the course of measured values in the further analysis. One example is the analysis of acceleration and/or braked deceleration of the vehicle (body and/or wheel), which may be derived using the known physical correlations from the graph of path/time or the graph of speed/time. The time is measured via the trigger time of the optical recording devices (i.e., the time between two consecutive images). This trigger time is a defined period of time specified for the measuring system. A depiction plotted against a sequence of images is therefore equivalent to a depiction plotted against time (see FIG. 5).

If necessary, to further improve the accuracy, additional correction factors or correction functions are used, which account for the dependence of toe and camber on the spring deflection state and the steering angle. These correction functions are vehicle-specific. It is therefore provided that the correction data are made available before the correction calculation is carried out via the vehicle data base for the specific vehicle type which is present anyway in a wheel alignment system. As standard procedure, vehicle identification is carried out before a wheel alignment measurement is performed.

If there are no vehicle-specific data available, the specific vehicle is automatically assigned to a predefined vehicle class, and the correction data to be used with it are provided by the vehicle data base. The vehicle is classified according to ground drive-relevant parameters, e.g., drive type (e.g., front-wheel drive, rear-wheel drive), vehicle class (e.g., sports car, sedan, SUV), or vehicle size (e.g., compact car, mid-sized vehicle, full-size vehicle).

When the 3D coordinates of the wheel features are corrected as described, they are back-calculated to a predefined reference time or a related reference position, and the rotating vector and the center of rotation of each wheel are then determined.

In a further embodiment it is provided that the analysis of the curved paths of the wheel and body features is not carried out in individual steps as described above, but in one regression analysis, as is known from the field of 3D image measuring technology. In variants, this regression analysis may relate to the entire vehicle, the front axle and the rear axle, or to each individual wheel. The application of the correction functions described above for toe and camber as a function of the spring deflection state and the steering angle, as necessary, is also provided.

What is claimed is:

1. A method for determining a rotational axis and a center of rotation of the vehicle wheel while a motor vehicle is being driven, comprising the steps of
    using at least two optical recording devices positionally assigned to each other;
    processing an image information that was recorded with consideration of several wheel features present on the wheel or attached for measurement purposes, by a downstream evaluation unit;
    using at least one body feature present on a body or attached for measurement purposes;
    detecting 2D coordinates of the wheel features and of the at least one body feature in a time-synchronized manner;
    based on the detection, calculating 3D coordinates of the wheel features and of the at least one body feature at certain time intervals;
    back-calculating the 3D coordinates of the wheel features and of the at least one body feature to a previously defined reference time or a related reference position of the vehicle wheel, with consideration for a distance traveled by the at least one body feature relative to the reference position;
    analyzing curved paths of the wheel features and of the at least one body feature in an evaluation with regard for effects of at least one of influencing variables of steering angle, steering motion, uneven road conditions, and speed change; and
    yielding by the analysis correction factors or compensation functions for correcting the effects.

2. A method for determining a rotational axis and a center of rotation of the vehicle wheel as defined in claim 1, further comprising performing said analyzing of the curved paths before said back-calculation of the 3D coordinates or while a combined compensating calculation is carried out as part of said back-calculation.

3. A method for determining a rotational axis and a center of rotation of the vehicle wheel as defined in claim 2, further comprising making available correction data via a vehicle data base for a particular motor vehicle type that is present anyway in a wheel alignment system.

4. A method for determining a rotational axis and a center of rotation of the vehicle wheel as defined in claim 3, wherein if specific vehicle data are lacking, automatically assigning a particular motor vehicle to a predetermined vehicle class, providing correction factors to be used by a database, and classifying motor vehicles according to parameters relevant to a ground drive.

5. A method for determining a rotational axis and a center of rotation of the vehicle wheel as defined in claim 1, wherein said yielding by the analysis correction factors or compensation functions for correcting the effects includes using roll angle data determined from a difference in a trajectory of the body features on a left side and a right side of the motor vehicle.

6. A method for determining a rotational axis and a center of rotation of the vehicle wheel as defined in claim 5, wherein said ascertaining of the correction factors or compensating functions includes using the correction factors or compensation factors which are spring motion data determined from a difference in a trajectory of the body features and a trajectory of the center of rotation of the vehicle wheel, both in an 'z' direction.

7. A method for determining a rotational axis and a center of rotation of the vehicle when as defined in claim 6, further comprising ascertaining steering angle data of the wheel from a parameter selected from a group consisting of a trajectory of the wheel features, a relative speed of the wheel features derived therefrom, and acceleration of the wheel features, and combinations thereof, relative to a trajectory of the body features in a projection of 3D trajectories in a plane of a road; and deriving the correction factors or the compensation function by simultaneously analyzing at least a left vehicle wheel, at least a right vehicle wheel, or both vehicle wheels.

8. A method for determining a rotational axis and a center of rotation of the vehicle wheel as defined in claim 1, further comprising ascertaining a dynamic motion data of a lift platform with the vehicle on it from an analysis of a trajectory of at least one of the measurement feature that is present on the lift platform or is attached thereto.

9. A method for determining a rotational axis and a center of rotation of the vehicle wheel as defined in claim 1, further comprising detecting higher dynamic processes over time of a trajectory selected from a group consisting of a trajectory of the wheel features, a trajectory of the body features and both, over a course of a parameter, as a function of further parameters.

10. A method for determining a rotational axis and a center of rotation of the vehicle wheel as defined in claim 9, further comprising selecting a route as one of the further parameters.

11. A method for determining a rotational axis and a center of rotation of the vehicle wheel as defined in claim 1, further comprising using additional correction data or correction functions that account for a dependence of a toe and camber on a spring deflection state and a steering angle.

12. A method for determining a rotational axis and a center of rotation of the vehicle wheel as defined in claim 1, further comprising performing a regression analysis based on the compensation functions in relation to an entire vehicle, to its front axle, to its rear axle, or to each individual wheel.

* * * * *